(12) United States Patent
Ledet

(10) Patent No.: US 10,761,689 B1
(45) Date of Patent: Sep. 1, 2020

(54) MOBILE CALL ENHANCEMENT

(71) Applicant: Open Invention Network LLC, Durham, NC (US)

(72) Inventor: David Gerard Ledet, Allen, TX (US)

(73) Assignee: OPEN INVENTION NETWORKS LLC, Durham, NC (US)

( * ) Notice: Subject to any disclaimer, the term of this patent is extended or adjusted under 35 U.S.C. 154(b) by 100 days.

(21) Appl. No.: 16/195,160

(22) Filed: Nov. 19, 2018

Related U.S. Application Data

(63) Continuation-in-part of application No. 15/810,598, filed on Nov. 13, 2017, now Pat. No. 10,157,041, which is a continuation of application No. 15/052,417, filed on Feb. 24, 2016, now Pat. No. 9,817,635.

(60) Provisional application No. 62/119,915, filed on Feb. 24, 2015.

(51) Int. Cl.
| | |
|---|---|
| *H04R 3/00* | (2006.01) |
| *G06F 3/0482* | (2013.01) |
| *H04M 1/725* | (2006.01) |
| *H04M 3/42* | (2006.01) |

(52) U.S. Cl.
CPC ...... *G06F 3/0482* (2013.01); *H04M 1/72597* (2013.01); *H04M 3/42059* (2013.01)

(58) Field of Classification Search
CPC ..................................................... H04R 3/00
See application file for complete search history.

(56) References Cited

U.S. PATENT DOCUMENTS

| | | | |
|---|---|---|---|
| 5,546,447 A * | 8/1996 | Skarbo ................ | H04M 1/575 379/142.05 |
| 6,128,318 A | 10/2000 | Sato | |
| 6,611,678 B1 | 8/2003 | Zweig et al. | |
| 6,873,692 B1 * | 3/2005 | Silver .................. | H04M 3/42 379/142.01 |
| 7,007,106 B1 | 2/2006 | Flood et al. | |
| 7,483,538 B2 | 1/2009 | McCarty et al. | |
| 7,483,958 B1 | 1/2009 | Elabbady et al. | |
| 7,734,028 B2 * | 6/2010 | Dhara .................. | H04L 29/06 379/142.04 |
| 2003/0099212 A1 | 5/2003 | Anjum et al. | |
| 2007/0226530 A1 | 9/2007 | Celinski et al. | |
| 2008/0089268 A1 | 4/2008 | Kinder et al. | |
| 2009/0264114 A1 | 10/2009 | Virolainen et al. | |
| 2009/0298420 A1 | 12/2009 | Haartsen et al. | |
| 2010/0316237 A1 | 12/2010 | Elberbaum | |
| 2011/0095875 A1 | 4/2011 | Thyssen et al. | |
| 2012/0010737 A1 | 1/2012 | Sakagami et al. | |
| 2012/0058727 A1 | 3/2012 | Cook et al. | |

(Continued)

*Primary Examiner* — Olisa Anwah

(57) ABSTRACT

An example operation may include a system, comprising a processor and a memory on which are stored machine readable instructions that when executed by the processor causing the processor to one or more of obtain a first caller name of an first received call, display a notification on the device, wherein the notification includes a first button and a first document, wherein the first document is associated with the first caller name, display a list on the device of at least one name of a second document when the first button is pressed, wherein the at least one second document is associated with the first caller name and replace the first document with the second document when the at least one second document name is selected from the list.

20 Claims, 10 Drawing Sheets

(56) References Cited

U.S. PATENT DOCUMENTS

| | | |
|---|---|---|
| 2012/0070004 A1 | 3/2012 | LaBosco et al. |
| 2012/0087503 A1 | 4/2012 | Watson et al. |
| 2013/0279888 A1 | 10/2013 | Zeng et al. |
| 2014/0323036 A1 | 10/2014 | Daley et al. |
| 2014/0328485 A1 | 11/2014 | Saulters |
| 2015/0025664 A1 | 1/2015 | Cory et al. |
| 2015/0215722 A1 | 7/2015 | Milne et al. |
| 2016/0350067 A1 | 12/2016 | Sundaresan et al. |
| 2016/0359512 A1 | 12/2016 | Fathollahi et al. |

\* cited by examiner

US 10,761,689 B1

MOBILE CALL ENHANCEMENT

FIELD OF THE INVENTION

The current application offers enhancements to telephony related to a user's device. More particularly, the application presents a Graphical User Interface (GUI) related to the incoming call on the device wherein the GUI relates to data that is related to the user of the device and the person originating the call. In another embodiment, the user may have simultaneous conversations with at least two different people on different networks.

BACKGROUND OF THE INVENTION

A framework designed to provide application developers an easy way to build and extend enterprise applications to multiple platforms from the same code. It is based on well-known standards based technologies including Java, HTML 5, JavaScript and CSS.

The framework offers a rich library of components that simplify interface development. The support of Java allows the framework to utilize the leading enterprise development language and supports the leading development tools and knowledge of the largest pool of application developers.

The framework also allows the developed code to be migrated effortlessly to multiple hardware platforms including mobile, tablet and desktop. The applications developed in the Oracle Mobile Application Framework allows access to the device's camera, GPS, contacts and local storage allowing the application full integration with the device's features.

Security is supported through encryption, control of access to the applications, authentication services among other enterprise-level features.

SUMMARY OF THE INVENTION

The application determines the most appropriate time to download a file that is considered large in size. When the user requests a file to be downloaded, the file is not automatically downloaded at that time, but may determine that it may be best to perform the download at a time that is more appropriate. The file is queued and when it is a more appropriate time (for example when the user is connected to a network that has at least a minimal amount of bandwidth), the queued file(s) is/are downloaded to the device.

An example operation may include a system, comprising a processor and a memory on which are stored machine readable instructions that when executed by the processor causing the processor to one or more of obtain a first caller name of an first received call, display a notification on the device, wherein the notification includes a first button and a first document, wherein the first document is associated with the first caller name, display a list on the device of at least one name of a second document when the first button is pressed, wherein the at least one second document is associated with the first caller name and replace the first document with the second document when the at least one second document name is selected from the list.

Another example operation may include a method comprising one or more of displaying a notification on the device, wherein the notification includes a first button and a first document, wherein the first document is associated with the first caller name, displaying a list on the device of at least one name of a second document when the first button is pressed, wherein the at least one second document is associated with the first caller name and replacing the first document with the second document when the at least one second document name is selected from the list.

Another example embodiment may provide a non-transitory computer readable medium comprising instructions, that when read by a processor, cause the processor to perform one or more of displaying a notification on the device, wherein the notification includes a first button and a first document, wherein the first document is associated with the first caller name, displaying a list on the device of at least one name of a second document when the first button is pressed, wherein the at least one second document is associated with the first caller name and replacing the first document with the second document when the at least one second document name is selected from the list.

DETAILED DESCRIPTION OF THE INVENTION

It may It may be readily understood that the components of the present application, as generally described and illustrated in the figures herein, may be arranged and designed in a wide variety of different configurations. Thus, the following detailed description of the examples of a method, apparatus and system, as represented in the attached figures, is not intended to limit the scope of the application as claimed but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples and the described features, structures, or characteristics may be combined in a suitable manner in one or more examples.

The disclosure discusses in part an application resident on a user device. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer, a laptop, a personal computing tablet, a smartphone or a device with a processor and memory.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first", "second" and "third" may be used to differentiate elements, but the modifiers do not necessarily indicate any particular order. For example, a first party may be so named although, in reality, it may be a second, third and/or fourth party.

Figure 1:
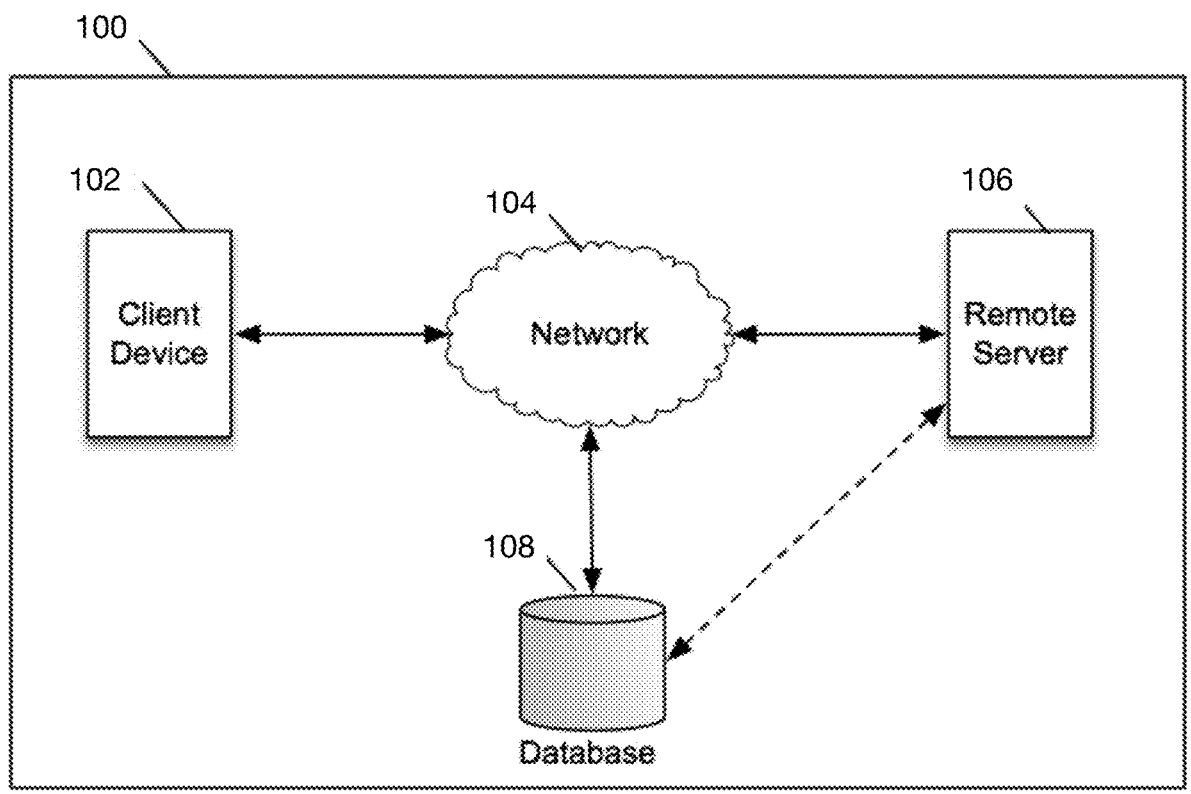
FIG. 1 illustrates a system diagram of the current application in one embodiment of the current implementation.

FIG. 1 displays a system 100 of the present invention, in one embodiment. The present invention, in the form of software for example, allows a user utilizing a Client Device 102, which may be a tablet computer, a laptop or desktop computer (in the form of software, for example) to be downloaded from the Remote Server 106. A Client's Device may also be a gaming system, a DVD player, or any other device that is normally utilized to consume media. Or the present invention in the form of software, for example can reside on the client device 102 that can be any of a mobile laptop device and/or a personal desktop computer or a mobile device. The computing device 102 is connected to the Network 104 (which may be the Internet or any other type of network). It should be noted that other types of devices, in addition to Client Device 102, might be used with the present invention. For example, a PDA, an MP3 player or any other wireless device, a gaming device (such as a hand held system or home based system) and the like (including a P.C. or other wired device) that can also transmit and receive information could be used with the present invention.

The user of the invention can interface with the Client Device 102 and connect through the Network 104 to the Remote Server 106. The Remote Server can be redundant or be more than a single entity without deviating from the scope of the invention. A Database 108 may directly or indirectly connect to the Remote Server or connected remotely through the Network 104 without deviating from the scope of the invention.

The application resides completely or partially on the User's Client Device 102, which can be a mobile device, but can also reside on a user's desktop computer, a personal digital assistant (PDA), tablet computer, or any other device containing a processor, memory and an operating system. In addition, the application can reside on either completely or partially on any one of the other elements in the system depicted in FIG. 1 for example, the Remote Server, a Database and/or the Network 104.

If the application resides on a device and is downloaded through a platform (such as an application store or market) residing on the device or accessed via the device or may be accessed through the device's browser communicably coupled to the Network 104. Further, the application can be pre-loaded on the device wherein the maker of the device preconfigures the application.

The current can work with any device such as a personal computer with a touch screen, a laptop with a touch screen, a personal computing tablet, a smartphone, a PDA or any device with a processor, memory and a touch screen.

Data is presented to the user of the Client Device 102 upon notification of an incoming call. This data can be one or more of a GUI automatically displayed on the device, a file displayed on the device, an audio file that is executed on the device, a video file that is executed on the device, or any other similar data presentation wherein the data is presented to the user upon notification of the incoming call.

In one embodiment, the current application resides in the memory of the Client Device 102. The application may be an application that is a separate entity such as applications that are normally downloaded to a device through an application store supported on the operating system of the device.

In another embodiment, the application may be integrated into the operating system of the device wherein the application is automatically executed upon an incoming call notification to the device.

In another embodiment, the application resides in the Remote Server 106 such that interactions between the Client Device and the Remote Server are through messaging wherein this messaging is routed through the Network 104. This messaging is the normal messaging such as the normal messaging between a Client Device and a network.

In yet another embodiment, the application resides in the Cloud, or Network 104 wherein messaging between the Cloud and the Client Device is through messaging. This messaging is the normal messaging such as the normal messaging between a Client Device and a network.

Incoming calls to a device are received with data pertaining to the incoming call. This information may contain such data as the caller's phone number otherwise referred to as the Caller ID. Users may opt to disallow their Caller ID to be delivered when making calls such that the incoming call is mapped to "Unknown" on the receiving device, otherwise referred to the Callee.

If the Caller is known to the Callee and the Caller is in the Callee's contact list, the operating system will automatically obtain the Caller's contact information and display this information on the display upon notification of the incoming call such that when the user is notified of an incoming call, their contact information is presented to the user on the device.

Having access to the Callee's information allows current application to obtain all stored data pertaining to the Callee, for example the email address of the Callee, all of the phone numbers associated with the Callee and other related information pertaining to the Callee.

Furthermore, other information related to the Callee can be obtained by the application through interfacing with other data on the Client Device.

Information related to the Caller is obtained (if available) on the user's device. Using the Caller phone number, which is received in the incoming call, programming allows for the current application to obtain additional information using the Caller's number.

For example, in one operating system, a class "PhoneLookup" contains a table that represents the result of looking up a phone number, for example for Caller ID. Using this object, the application is able to obtain the details of the incoming call.

The PhoneLookup class contains:

| Base Type | Type | Description |
|---|---|---|
| String | Number | Phone Number |
| String | Type | Phone Number Type |
| String | Label | Custom label for the phone number |

The following code is an example of accessing the phone number, then obtaining the Display Name of the Caller.
Uri uri=Uri.withAppendedPath(PhoneLookup.CONTENT_FILTER_URI,Uri.encode(phoneNumber));
resolver.query(uri, new String[ ]{PhoneLookup.DISPLAY_NAME, . . . .

Using the object PhoneLookup, the phone number of the incoming call is obtained and placed in a local object "URI". URI is a uniform resource identifier used to store resources as a string. Columns from the Contacts Class table are also available through a join such that the following attributes can be obtained:
DISPLAY_NAME
PHOTO_ID
HAS_PHONE_NUMBER
TIMES_CONTACTED
LAST_TIME_CONTACTED
STARRED
CUSTOM_RINGTONE
SEND_TO_VOICEMAIL The current application gains details such as the name of the contact, the phone number, etc. of the Caller. These details are then used to search other applications, contact lists, etc.

When the incoming call is presented to the user, the application's functionality is executed such that the caller's information is searched to determine any previously, known interactions with the user. Software enhancements are made in the functionality of the device such that additional functionality is executed when an incoming call is presented to the device.

The application, through analysis of the incoming call information further depicted herein, searches applications and contacts on the user's device such that previous interactions between the user and the caller are determined and further analyzed.

The application also searches any shared calendars in the user's calendar application for events and/or tasks that are shared between the user and the Caller. The application interacts with the calendar application directly or through APIs associated with allowing outside applications access to the calendar's internal data.

Figure 2:
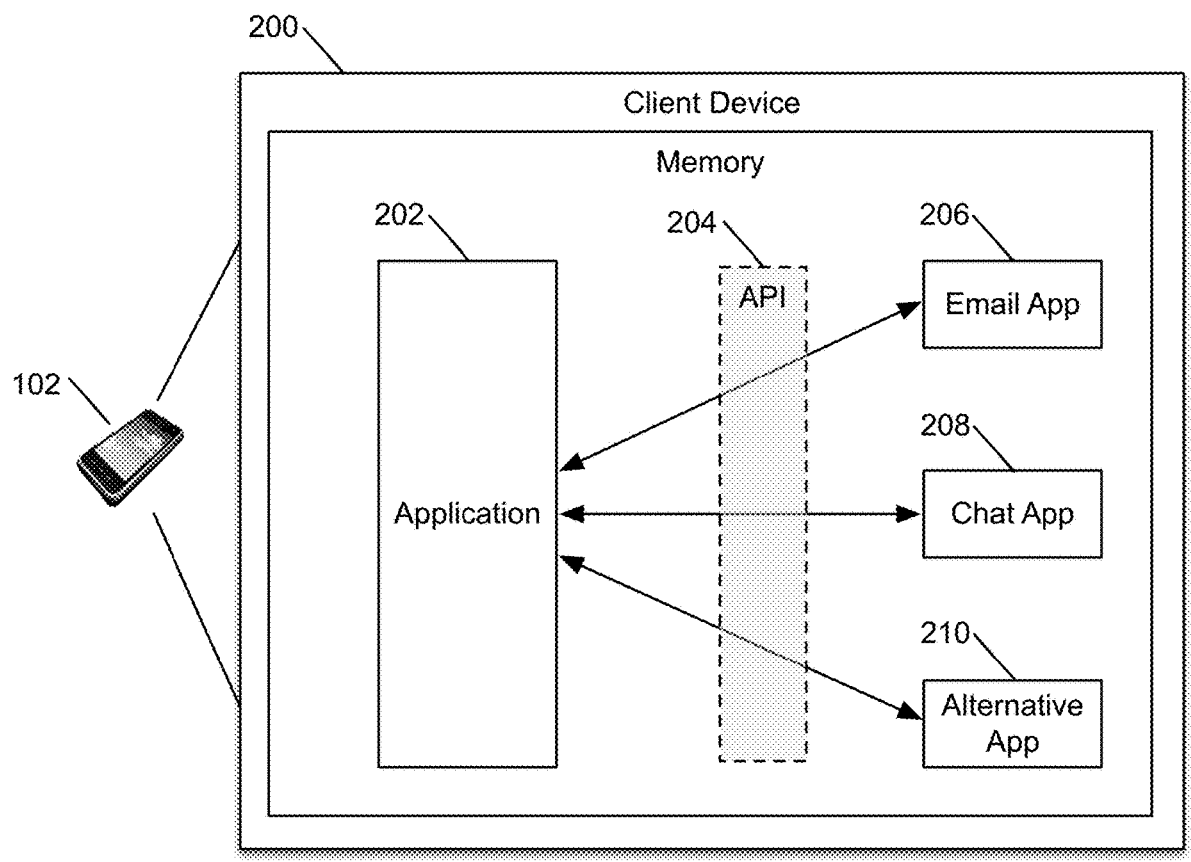
FIG. 2 illustrates the current application executing in the client device in one embodiment of the current implementation.

FIG. 2 is one implementation of the current application depicting the application executing in the Client Device 102 200. The application interacts with other applications to determine any previous interaction between the user and the Caller.

The application may execute methods on an API 102 to interact with the other programs 204, 206, 208. Methods called on the API allow a flow of data that is internal to the other programs.

An email application 206, a chat application 208, or any number of other applications 210 may be queried or otherwise interacted with to obtain data relating to the Caller.

The application queries the emails in the user's device, searching for the emails containing the caller. Once an application is authenticated, popular APIs allow for searching emails related to specific search criteria. Messages (i.e. emails) are returned.

As one example, the application can query emails in the email application using an HTTP method using the following syntax:
GET https: www.googleapis.com/gmail/v1/users/me/messages?q="in:sent after:2014/01/01 before:2014/01/30"

In this example, the user's emails may be searched filter files using the messages.list and threads.list methods. These methods accept the "q" parameter, which supports the same advanced search syntax as the web-interface. This means messages may be filtered using search queries such as the sender, date, or label, etc. For example, the following query retrieves all messages sent by the user between Jan. 1, 2014 and Jan. 30, 2014:

The email data can be searched by the application for specific keywords, phrases, etc.

The application queries chat sessions in the user's device, searching for the chat sessions between the user and the caller. To query conversations between the user and the caller, the Caller ID is used to obtain the conversation data.

For example, to obtain a list of all conversations between the user and the Caller, query the content://mms-sms/conversations Uri:
ContentResolver contentResolver=getContentResolver( );
final String[ ] projection=new String[ ]{"*"};
Uri uri=Uri.parse("content://mms-sms/conversations");
Cursor query=contentResolver.query(uri, projection, null, null, null);
Looping through the Cursor "query" will retrieve the data associated with the conversations between the two users. For example:
String selection="_id="+id;
Uri uri=Uri.parse("content:/sms");
Cursor cursor=contentResolver.query(uri, null, selection, null, null),
String phone=cursor.getString(cursor.getColumnlndex("address"));
int type=cursor.getInt(cursor.getColumnlndex("type"));//2=sent, etc.
String date=cursor.getString(cursor.getColumnlndex("date"));
String body=cursor.getString(cursor.getColumnlndex("body"));

Wherein the body string is the conversation text. Using this method, all conversations between the user and the Caller are obtained. In another embodiment, the search is made for conversations between a distinct time period such that older, unusable conversations are omitted from the results.

Once the conversation data is obtained, the chat data can be searched by the application for specific keywords, phrases, etc.

Other applications are queried seeking documents that may have been collaborated on with the user and the Caller. APIs associated with the respective applications allow the current application to query the internal data of the application such that the files that match the query (i.e. the Display Name of the Caller) are returned in the response of the query.

For example, a project management application may be utilized on the Client Device wherein the user and the Caller may have collaborated or otherwise discussed via messaging. This file(s) associated with the project management application related to the Caller is of interest to the current application.

Upon reception of an incoming call, the application is executed such that the data of the Caller is utilized to automatically search the user's Client Device seeking a relationship between a file or files related to the user and the Caller.

The file can reside entirely or in part on the Client Device 102, entirely on in part on:
  Database 108 which may or may not communicably coupled to a Remote Server 106
  Remote Server 106
  Database 108 located entirely in the Remote Server 106
  Network 104
  Another element in the system containing a processor and memory A query is made to the file storage where the document is located. This query message is through internal messaging when the document is stored locally, or through messaging routed through the Network when the document is stored remotely to the Client Device. In another embodiment, the document may reside in more than one location wherein software in the Client Device joins the separate areas of the document resulting in a single document.

If a document is found, it is presented to the user via a GUI screen such that the file is present in a near simultaneous period of time as the notification of the incoming call.

In another embodiment, an audio sound is played on the Client Device upon reception of the incoming call wherein the sound is the voice of the Caller.

In an alternate embodiment, the current application's functionality is executed to indicate that in addition to the reception of a call, the current application is seeking data to display on the device. A configured or static tone or haptic feedback is played on the device, in addition to any audio or haptic feedback normally played upon an incoming call allowing the user to understand that the current application is attempting to locate related data to be displayed.

Upon the location of a file of interest, wherein the file of interest is a file that is related to the Caller, the file is presented to the Client Device.

Figure 3:
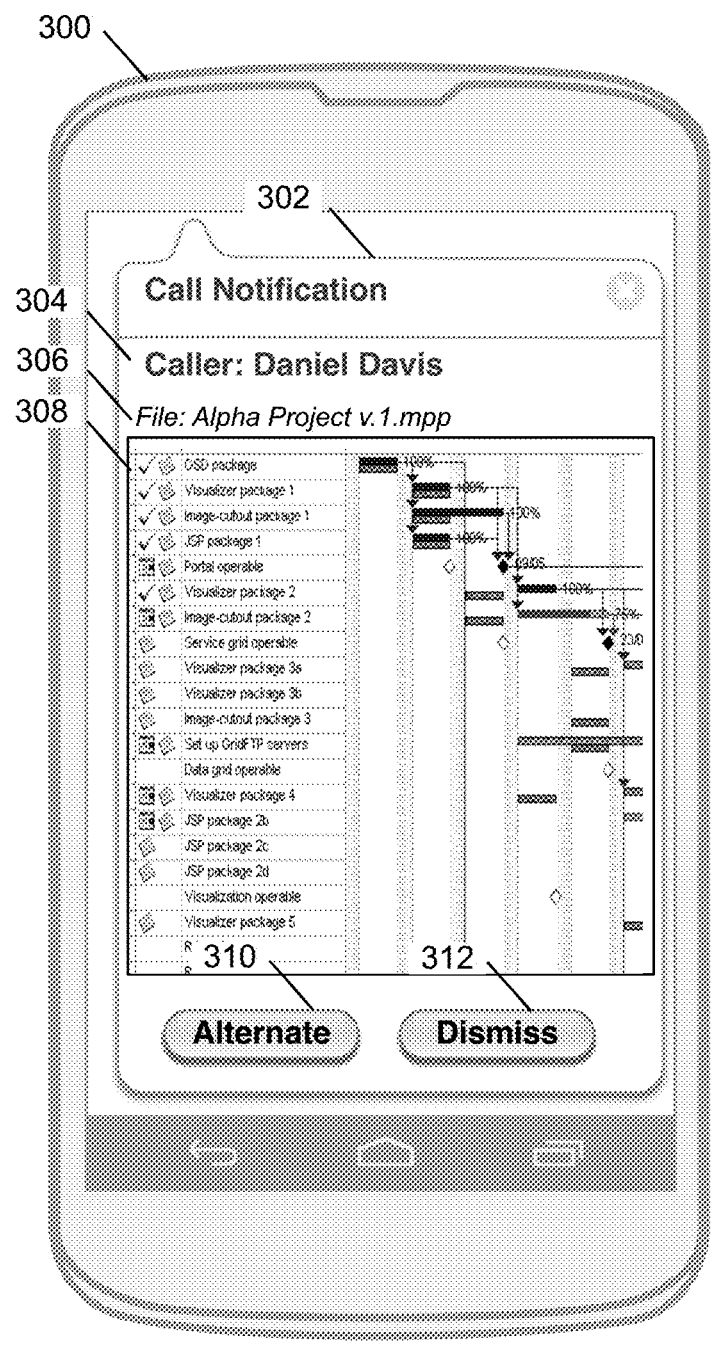
FIG. 3 illustrates a document displayed on the client in one embodiment of the current implementation.

FIG. 3 is one possible implementation of the application depicting a document displayed on the Client Device upon call reception 300.

The GUI displays a Call Notification window 302 including the name of the Caller, a file that is related to the Caller and buttons for interactions. The GUI interaction is a separate process from the connection of the call such that the user is connected to the Caller as a process separate from the user's interaction with the Call Notification 302.

There exists a title of the notification "Call Notification" such that the user is able to determine the reason for the notification.

The name of the Caller is displayed on the top portion of the Notification 304. This allows the user to quickly see the name of the person who is calling the device.

The name of the displayed file 306 is above the document allowing the user to understand the name of the file displayed in the notification.

A project management file is displayed on the notification window 308. This document is a file that has been determined by the application to be related to the Caller. This may be the most recent document (as determined by the timestamp of the document) that the user and the Caller worked on or otherwise collaborated on.

In one embodiment, the document 308 is an image representation of the document and not an actual document allowing interaction. The user is able to drag the image inside the document window 308 wherein the image moves to display more of the image inside the window.

In an alternate embodiment, horizontal and/or vertical scrollbars are present such that the user is able to move the scrollbar(s) to move the image in the document window.

In an alternate embodiment, the document is the actual document of the application wherein interactions with the document executes the associated application functionality inside the notification window.

Buttons on the bottom of the notification window allow the user to interact with the GUI. An "Alternate" button 310 allows the user to select another file wherein the current file is not a file that the user desires. A "Dismiss" button 312 allows the user to easily dismiss the notification such that the notification is removed from the display.

Figure 4:
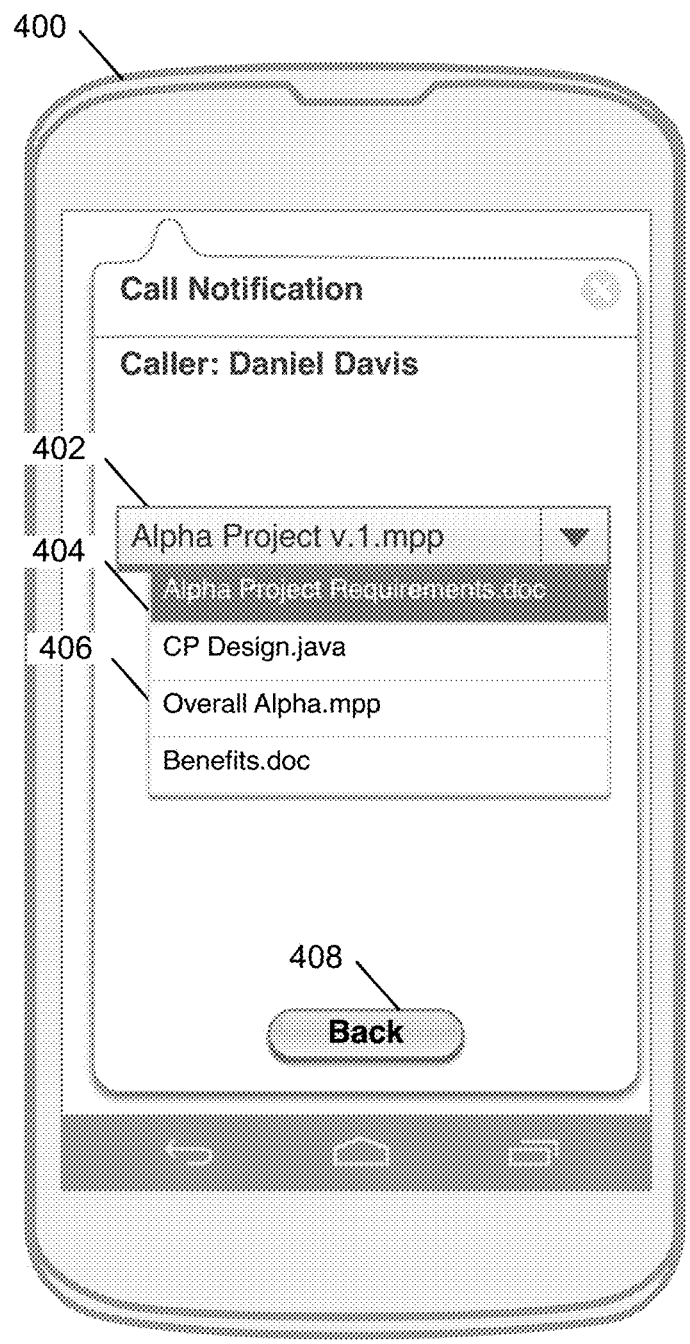
FIG. 4 illustrates a GUI snapshot after the user has pressed a button in one embodiment of the current implementation.

FIG. 4 is one possible implementation of the application depicting a GUI snapshot after the user has pressed the "Alternate" button 310 400. A dropdown component 402 is displayed wherein the user is able to choose a document. The list of documents includes documents that are related to the user and the Caller.

The currently displayed document is displayed in the top portion of the dropdown component 402. The first document in the list of documents is currently the selected document 404. All documents that are related to the user and the Caller are listed in the items of the list 406.

The user can choose a document in the list by clicking any of the documents wherein that document is displayed in the document window 308.

A "Back" button 408 is displayed on the bottom of the window allowing the user to navigate to the previous window 302.

Figure 5:
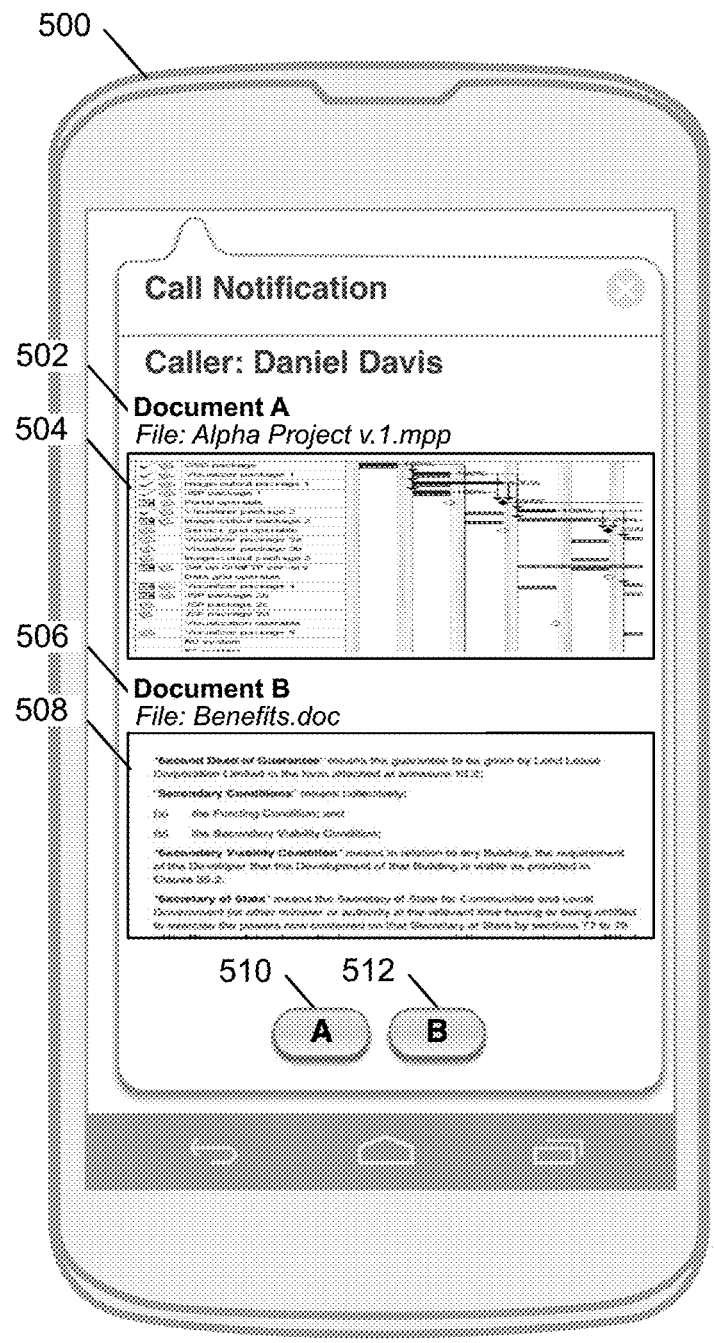
FIG. 5 illustrates a notification window in a GUI snapshot on the client device in one embodiment of the current implementation.

FIG. 5 is one possible implementation of the application depicting a GUI showing the notification window with a choice of two documents related to the user and the Caller 500.

In one embodiment, a choice of two documents is presented in the notification window when two documents are found that related to the user and the Caller such that both documents are within a configurable or predetermined timeframe, for example both documents have a timestamp within the last 7 days.

There exists labels "Document A" 502 and "Document B" 506 such that the two windows are clearly depicted.

The first document window 504 shows the first document and the second document window 508, the second.

On the bottom of the notification window, there exists two buttons allowing the user to choose between the two documents. An "A" button 510 selects the first document and a "B" button 512 selects the second document.

Upon pressing a button (510 or 512), the respective document is displayed in a single document window wherein the other, unselected document is removed from the display.

In another embodiment, the user can press a document (either 504 or 508) to select that respective document such that the document is expanded and the other unselected document is removed from the display.

The current application allows for the management of network connections based on different criteria. The application, through the interaction of the GUI can switch to a different network interface.

A mobile device switches between the Mobile or Cellular network (3G, 4G, etc.) and Wi-Fi network interfaces based on:
  Sound quality
  Free and/or amount of data
  Current reception of a network (amount of bars)

The application can also manually perform the switching to an alternate network interface based on GUI interaction. As such, actions that the user chooses to cause the application to switch the network connectivity.

Mobile devices have multiple interfaces to the Network 104 (e.g. Wi-Fi, 3G, 4G, etc.) These interfaces allow voice and/or data connections. The application can monitor network connections and switch between the interfaces automatically, or as indicated through interactions with the user and the application.

Through functional implementation, the current application monitors the network connection and can programmatically alter the network connection as desired.

ConnectivityManager connectivityManager=(ConnectivityManager)getSystemService(Context.CONNECTIVITY_SERVICE);
    if(connectivityManager!=null){
      NetworkInfo networkInfo=connectivityManager.getActiveNetworkInfo( );
      netType=networkInfo.getType( );
      if(networkInfo.isAvailableO && networkInfo.isConnected( )){
        if(netType==ConnectivityManager.TYPE_WIFI)
          //Connection is a Wi-Fi connection
        else
          if(netType==ConnectivityManager.TYPE_MOBILE)
            //Connection is a Cellular connection The code above depicts a sample programming to obtain the network connection as an example only.

The method getActiveNetworkInfo on the connectivityManager class is called that returns the information related to the active network of the device. This is stored in a NetworkInfo type. The type of network is obtained from the NetworkInfo variable and stored into a local, "netType".

This "netType" variable is compared against a static string to determine the type of connection, ConnectionManager.TYPE_WIFI indicates a Wi-Fi connection and ConnectionManager.TYPE_MOBILE indicates a mobile, or cellular connection.

Through this and similar functionality, it is possible to determine and set the type of network connection such that the user's interface with GUI components on the display can affect the network connection.

Client Devices (for example mobile device) normally allow multiple, simultaneous calls. In one scenario, a call is connected and active. A second call will be received wherein the user has the option to "Swap" calls such that the first call is placed on hold and the second call is activated. Swapping between the two active calls then can occur via the GUI interaction of the user of the device.

The current application allows for one call to utilize a particular network connection and another call to utilize another (for example Cellular and Wi-Fi). This scenario may be beneficial when the device has access to a Wi-Fi connection, yet due to the amount of data that is transferred on the network between the Client Device 102 and the Network 104, splitting the network connections between the two calls may provide an enhanced experience.

Figure 6:
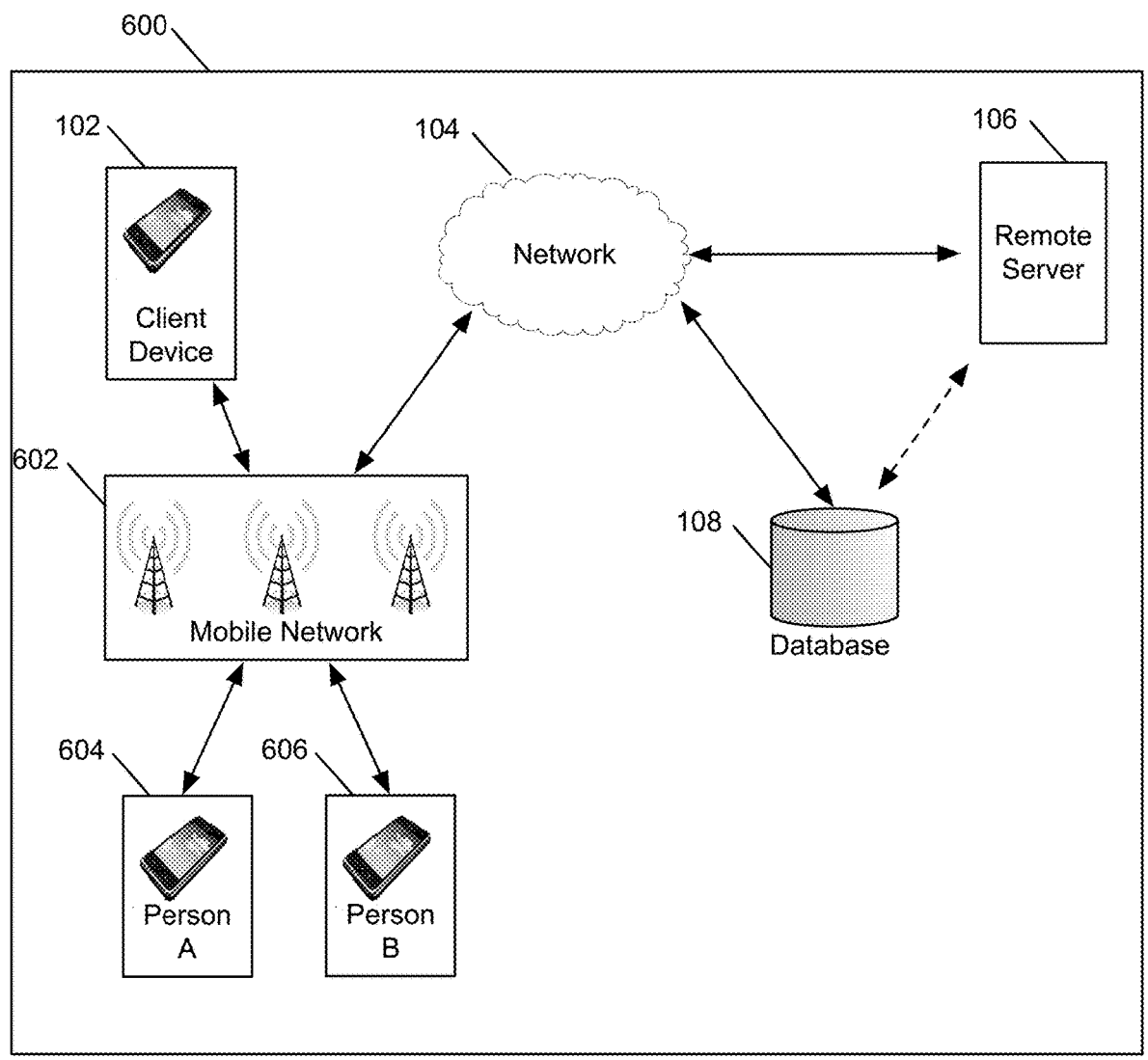
FIG. 6 illustrates a second system diagram in one embodiment of the current implementation.

FIG. 6 is a system diagram of one implementation of current application 600. The Client Device 102 communicates with the Mobile Network 602, which communicates with the Network 104. Two remote callers (Person A 604 and Person B 606) are also connected to the Mobile Network 602. The remote callers may be utilizing non-mobile devices without deviating from the scope of the current application.

In one embodiment, two active connections (for example, calls, text, photos, videos, multimedia and/or any type of data being sent and/or received) on the Client Device 102 are maintained through the related applications (for example, documents) of their respective connections. For example, the user is actively conversing with Person-A 604 and Document-A has been selected through processes described herein. Another call, Person-B 606, is received at the device wherein the user is notified of the call and has the ability to "Swap" to the other call. The application, through processes depicted herein allows the user to choose a related document to Person-B. In an additional embodiment, the document related to Person-B is automatically selected by the application through processes included herein.

The application automatically selects one network (e.g. Mobile) for the Person-A call and another network (e.g. Wi-Fi) for the Person-B call through programming discussed herein. The user is shown the two documents related to the two active calls.

Figure 7:
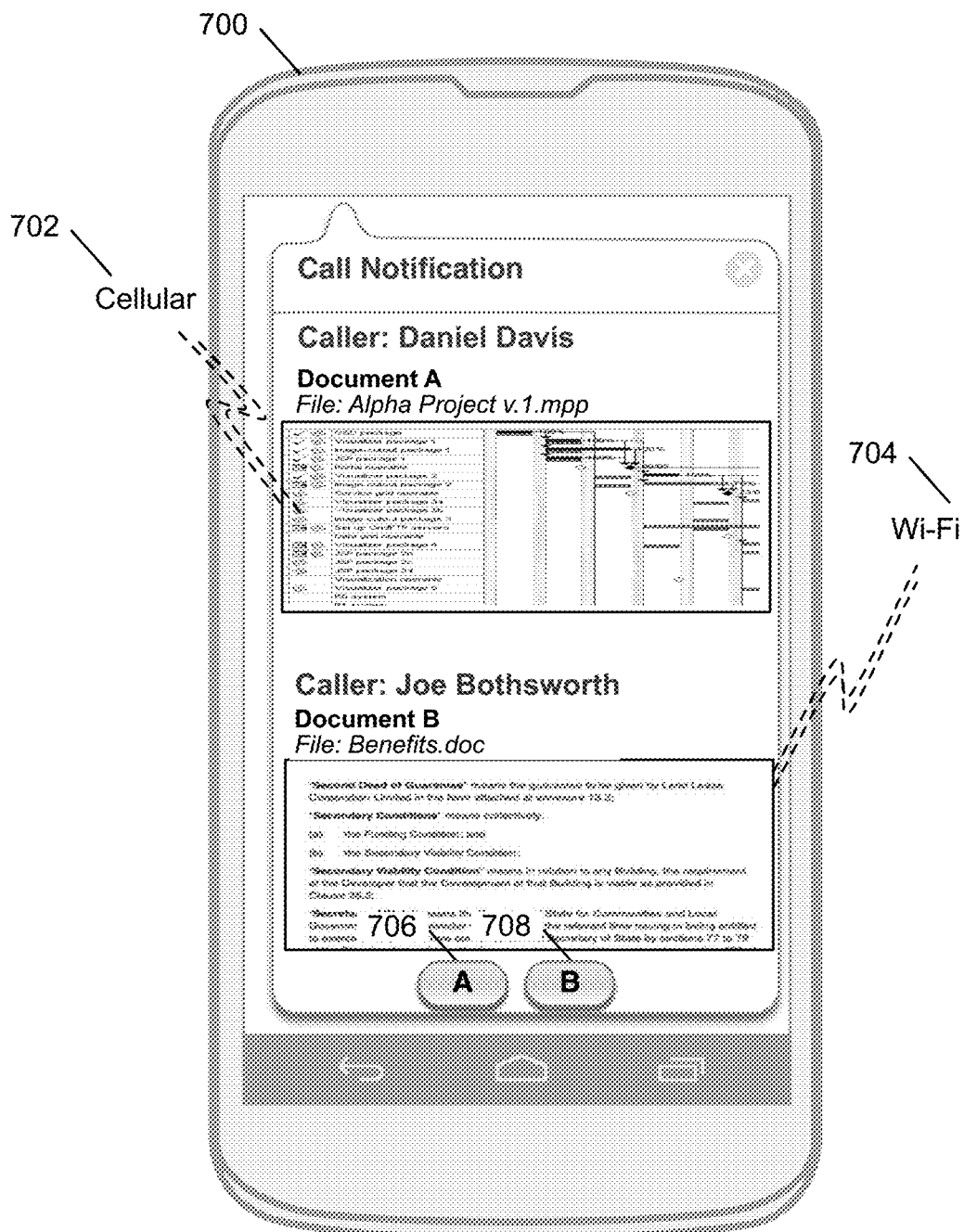
FIG. 7 illustrates two different documents related to two active calls on a client in one embodiment of the current implementation.

FIG. 7 is a GUI of an example of one implementation of the application depicting two different documents related to two active calls on the device 700.

The first document 702 is a call utilizing the cellular network interface and the second document 704 is a call utilizing the Wi-Fi network interface.

The respective Callers of each of the active calls are labeled above their respective documents. The first document is related to the Caller: Daniel Davis", and the second document is related to the Caller: "Joe Bothsworth". There are buttons on the bottom of the window for interaction from the user. 706, 708).

A button labeled "A" 706 is pressed to swap the call to the call related to the first document 702 wherein the first document is expanded and the second document is removed from the display.

The Document A 702 is related to Person A 604 and Document B is related to Person B 606. The application knows to connect the respective document to the respective caller automatically. A signal is sent from the phone to the wireless equipment in a similar fashion that a signal that occurs when the user presses a "Swap" button allowing the current call to be placed on hold and connect with the another, established call. Also, similar to the functionality that occurs with a call waiting functionality is performed on a mobile device.

The functionality to swap between the two calls is of similar functionality that current mobile devices execute to swap calls. A message is sent from the current application to the device's software to tell the device to initiate the swap functionality.

In another embodiment, the current application's swap functionality is built into the lower-level software of the Client Device such that the application's software replaces the lower-level software or takes over the lower-level software performing the swap functionality. The functionality occurs in the Client Device 102 entirely, or partially on the Client Device and partially on a remote processor remotely located in which messaging occurs between the Client Device and the remote processor through the Network 104.

The application at the Client Device 102 tracks the document related to the respective call in the scenario when there are two or more active calls. When the active call is switched, the application automatically activates the current document related to that call such that the GUI is updated to display the document related to the currently, active call.

A button labeled "B" 708 is pressed to swap the call to the call related to the second document 704 wherein the second document is expanded and the first document is removed from the display.

In an alternate embodiment, touching part of the screen affects both the call and the GUI display. For example, if the user touches part of the screen within the first document (Document A), that call is made active and the Document A is expanded to the entire screen. The same processing is performed for the user touching the part of the screen within the second document (Document B) wherein the call associated with Document B is made active and the Document B is expanded to the entire screen.

In an alternate embodiment, any user interaction with the part of the screen displaying any of the documents (i.e. the document portion, scrollbars for that respective document, the document label "Document A" or "Document B", the file name(s) of the document, or any other part of each respective document GUI portion activates that document.

In an alternate embodiment, instead of swapping between the calls, the application supports having two calls at the same time (e.g. one over the cellular network and one over the Wi-Fi network). The previously mentioned swapping of the two calls, especially pertaining to the GUI interactions allowing the swapping of the at least 2 calls is a feature that is made active via a feature bit (for example, maintained in a configuration area of the application).

The documents (Document A and Document B) may be stored on the Client Device 102 or may be partially located in the Client Device and partially located in a remote processor, or fully located in a remote processor wherein a remote processor is the Database 108 which may or may not be communicably coupled to a Remote Server 106, the Remote Server 106, a Database residing inside the Remote Server, or any other element of the network containing a processor and memory. If the entire or partial part of the document(s) is/are located remotely to the Client Device, messaging between the remote processor and the Client Device is routed through the Network 104.

In another embodiment, the user may have two calls active on the Client Device 102 such that the user has an active call with Person A 604 having Document A related to that call and another active call with Person B 606 having Document B related to that call. The user may be talking with Person A but working on Document B in real-time. For example, the document B may be a Google document or another cloud-based application.

The documents (Document A and/or Document B) may be located in the Client Device 102, or may be located remotely in another processor remotely, or located entirely in the Network 104. If the document is stored remotely, the application interacts with the remote application through the Mobile Network 602, then to the Network 104 and (if necessary), to the remote processor. In addition, the documents may be partially located in the Client Device and partially located in a remote processor.

Client Devices 102 (for example mobile device) are usually devices that allow for multimedia content. For example, devices are able to view images, play audio files, video files, as well as much other different content. These files can become rather large in size.

Video files can become large in size, as in today's market High Definition (HD) video is common. Video files can quickly become gigabits in size depending on the length of the video.

Bandwidth of devices has grown through the use of providers expanding the network to include high-speed capabilities, yet there is still a period of waiting when the user has chosen to download files that are large in size, for example HD video files. Fourth Generation Long-Term Evolution (4G LTE) uses new Digital Signal Processing (DSP) techniques and modulations that were developed around the turn of the millennium offering speeds that are generally 10 times the speed of the Third Generation (3G) network. Many of today's mobile devices are utilizing the 4G/LTE communications standard, yet the device is only able to upload and download files at the 4G/LTE speed if they are currently within that network. As users move, they may drop in and out of the said network and may fall back into a "default", widely available 3G network, which offers a much lower bandwidth.

The current embodiment of the application offers the ability for the Client Device to initiate the download of a large file at a time when the network connection allows the quickest download, thus minimizing the time of the download.

Examples below offer possible implementations of the device initiating the download of large files at a different time than when the user has requested the file. As such, GUI screen shots and programming implementation depicted herein offer specific implementations of the functionality. The implementations do not specify exactly how the functionality of the current application should be performed but offer only a high-level of the overall functionality that is desired. One versed in programming techniques can easily implement other solutions that differ in their granularity of the depicted solution without deviating from the scope of the current application.

To implement the download management functionality, there are at least 3 areas of development:
  Establish the vales that determine the file size to initiate the functionality
  Establish the values that determine the bandwidth throttle
  Establish a period of time when the user prefers to initiate the download functionality.

In another embodiment, the size of the file to be downloaded is a determination factor in the current functional implementation.

This file may be static in nature wherein the current application automatically (through static implementation of the code in the application) determines the ceiling value of the file size to which the functionality of the current embodiment is initiated.

The software may also, alternatively set an optimal size for the file such that the user may wish to queue files that are equal, almost equal, or at a size that is closer to the optimal value.

Alternatively, the size of the file to be queued may established by the user dynamically wherein the user is able to specify the ceiling value of the file size to which the functionality of the current embodiment is initiated. This specification is functionally implemented in the configuration area of the current application wherein the user is able to choose the file size. This determination is through interaction of the GUI by the user. The user chooses the file size through components on the GUI. Different GUI components are available to select the file size. A text entry component allows the user to enter a numerical value. The related type of size follows this. For example, the user enters a value in the text component and then chooses the related type.

Figure 8:
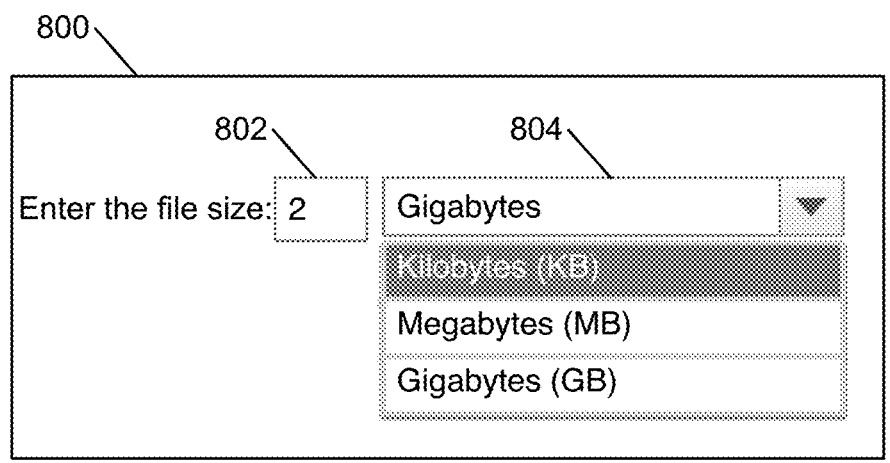
FIG. 8 illustrates a configuration GUI window on a client device in one embodiment of the current implementation.

FIG. 8 is one implementation of the current application depicting the configuration area wherein the user is able to choose the ceiling size of the file wherein the functionality is initiated to delay the download of the file 800.

A text entry component 802 allows the entry of a numerical value. A dropdown component 804 allows the user to choose the type of value related to the number entered in the text entry component.

The bandwidth is also a determination factor in the current functional implementation.

This element may be static in nature wherein the current application automatically (through static implementation of the code in the application) determines the ceiling value of the bandwidth to which the functionality of the current embodiment is initiated.

The software may also, alternatively set an optimal size of bandwidth such that the user may wish to initiate the downloading of queued files when the bandwidth is equal, almost equal, or at a bandwidth (for example Mbps or Gbps) that is closer to the optimal value.

Alternatively, the bandwidth to initiate the download may be established by the user dynamically wherein the user is able to specify the bandwidth value to which the initiation of the downloading is performed. This specification is functionally implemented in the configuration area of the current application wherein the user is able to choose the bandwidth. This determination is through interaction of the GUI by the user. The user chooses the bandwidth through components on the GUI. Different GUI components are available to select the bandwidth. A text entry component allows the user to enter a numerical value. The related type of bandwidth follows this. For example, the user enters a value in the text component, and then chooses the related type.

The current latency of the network connection can be determined by the application by performing quick calculations. This speed is then used to determine what the current speed of the network is at that time. For example, the JavaScript code below determines the time it takes to download a page on the device.

```
function onLoad( )
  var now=new Date( ).getTime( );
  var latency=now-start;
  alert("page loading time."+latency);
}
```

Alternatively, it is possible to determine the speed of the current Wi-Fi connection programmatically.

```
WifiManager wifiManager=Context.getSystemService
  (Context.WIFI_SERVICE);
WifiInfo wifiInfo=wifiManager.getConnectionInfo( );
if (wifiInfo!=null)
{
  //measured using WifiInfo.LINK_SPEED_UNITS
  Integer linkSpeed=wifiInfo.getLinkSpeed( );
}
```

Using this, or other similar functionality, it is possible to determine the current latency of the network.

Figure 9:
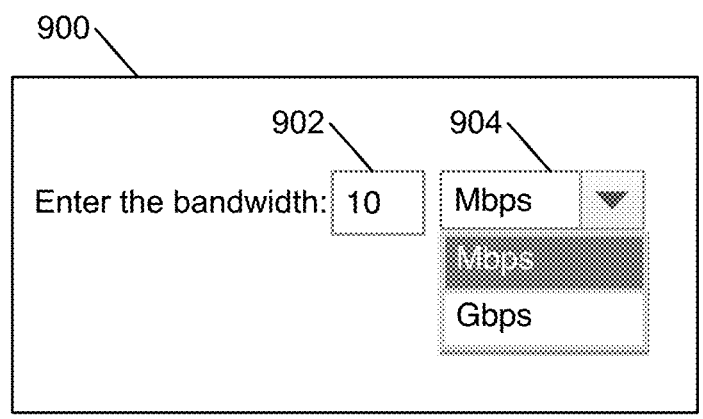
FIG. 9 illustrates a second configuration GUI window on a client device in one embodiment of the current implementation.

FIG. 9 is one implementation of the current application depicting the configuration area wherein the user is able to choose the lowest bandwidth of the network connection wherein the functionality is initiated to delay the download of the file 900.

A text entry component 902 allows the entry of a numerical value. A dropdown component 904 allows the user to choose the type of value related to the number entered in the text entry component.

The functionality of the application would initiate if the current network connection's bandwidth fell below the throttle established in the configuration 900.

The current application allows for the establishment of a proper time to download files that have been delayed for downloading.

This element may be static in nature wherein the current application automatically (through static implementation of the code in the application) determines the specifications of when the downloading of a delayed file is to be performed. This can be established by downloading a delayed file when conditions (such as depicted below) are met.

Alternatively, the user is able to specify the conditions to initiate the downloading of queued files. This specification is functionally implemented in the configuration area of the current application wherein the user is able to choose the conditions. This determination is through interaction of the GUI by the user. The user chooses the conditions through components on the GUI. GUI components are available to select the conditions. Many different elements can exist as to the conditions of when a queued file is downloaded. For example, the following lists some possible configurations:

The user has entered into any Wi-Fi connection

The user has entered into any Wi-Fi connection with at least a minimally specified amount of bandwidth The user has entered into a Wi-Fi connection that is a predetermined Wi-Fi connection, for example the area wherein a home or work Wi-Fi connection is established The user has entered into a particular type of network (for example 4G LTE)

The user has entered into a network offering at least a minimally specified amount of bandwidth Other similar considerations wherein the network and/or bandwidth is configured.

The application queues and dequeues the files delayed for download wherein the queue is located in the Client Device 102.

In another embodiment, the queue resides in a component outside of the Client Device, for example a Database 108 that may or may not be communicably coupled to a Remote Server 106, a Remote Server 106, the Network 104, or any other element in the system containing a processor and memory. In another embodiment, the queue may exist entirely in one of the mentioned devices, or partially in more than one of the mentioned devices.

If the queue resides outside of the Client Device, messaging occurs between the Client Device and the entity containing the queue such that the messaging is routed through the Network.

Once the application determines that a request file should be delayed (further disclosed herein), the file is queued for downloading at a later time.

When entering a network (for example 3G, 4G, Wi-Fi, etc.), the software performs a check to determine if the current bandwidth is sufficient according to the established bandwidth in the functionality disclosed herein. If the bandwidth is at a level that is at or above the minimally set bandwidth, a check is made if any files are queued for downloading by querying the queue, further disclosed herein. If there is at least one file to download, the software dequeues a file and begins to download the file to the Client Device.

Figure 10:
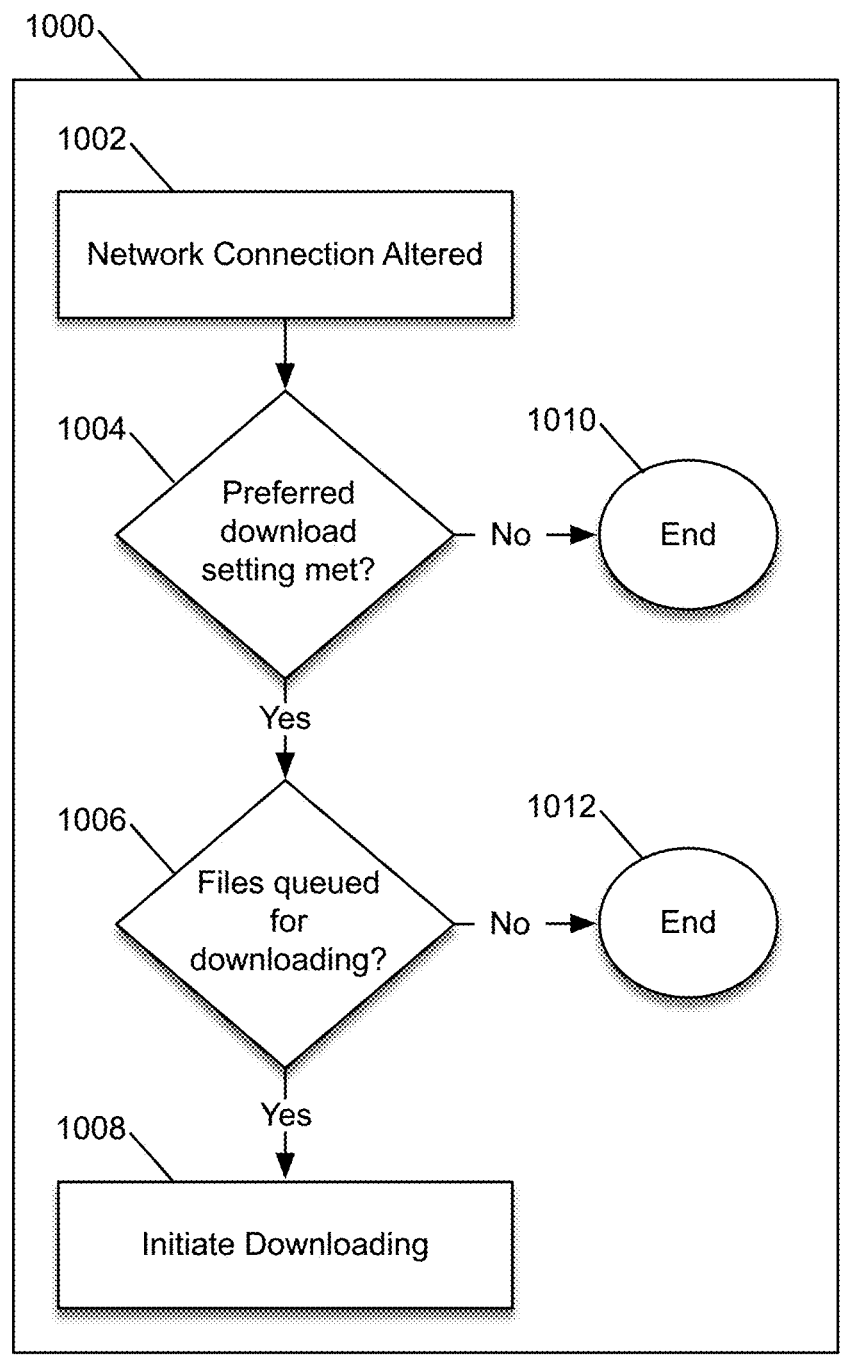
FIG. 10 illustrates a flow of determining when to begin the download of a queued file in one embodiment of the current implementation.

FIG. 10 is a flowchart of a possible implementation of the current application depicting the flow of determining when to begin the download of a queued file 1000. The application is first activated upon notification that a network connection has been obtained, exited, or otherwise altered 1002. See further details of when the network is altered herein for more information. A check is made if the minimal bandwidth established in details further disclosed herein is currently available 1004. This may include checking the throughput of the bandwidth available, checking the current network type (3G/4G, Wi-Fi, etc.), checking the SSID of the currently connected Wi-Fi, or any other similar or dissimilar means. If the minimally set bandwidth is not currently available, the process is ended 1010.

If the bandwidth is currently available, a check is made if any files have been queued for downloading 1006. If the queue is remotely located, messaging occurs between the Client Device 102 and the remote element wherein the messages are routed through the Network 104. If there is no files queued, the process ends 1012.

If the threshold is met for downloading the queued files, a file is dequeued wherein the Client Device begins the downloading of the file to the Client Device 1008.

In another embodiment, the time of day is currently taken into consideration in determining the initiation of download a file or files. In this scenario, there is a cost difference in the data consumption based on the time of day where the cost of bandwidth usage is billed at higher rate and busy times than times when usage is lower. This is implemented in the configuration of preferred downloading times such that the user is able to input the preferred time to download files, the times specified being the lower cost.

via yet another embodiment, upon the downloading of a queued file, the user is notified of this through a notification sent to the Client Device such that the user is made aware of the downloading of a previously queued file. The details of the file including the file name, the size of the file, the amount of data downloaded thus far and any other information related to the downloading of a file from a remote location.

In yet another embodiment, the user is not notified of the downloading of a previously queued file.

In yet another embodiment, as signal of the current network connection begins to diminish (for example, the user begins to move out of the network connection geographic area), the application notifies the user of this activity by sending a notification to the user stating that the user is currently downloading a file.

In yet another embodiment, there exists a GUI component, for example a "Pause" button on the notification wherein the user is able to pause the downloading of the file. This may be in the case where the user wishes to move from the current network connection and resume the downloading of the file at a later time. The current application tracks how much of the file was downloaded and when the downloading is resumed (as further disclosed herein), the system automatically determines where to resume the downloading thus allowing the file to be "restarted" in the downloading process without having to begin the download of the file from the start. Furthermore, the software understands how to merge the original downloaded portion and the newly downloaded portion through functionality that is currently available. Such software exists in the software of torrent file downloading where partial file contents are downloaded from multiple different locations and merged into a single file.

What is claimed is:

1. A system, comprising:
a device comprising a processor and memory on which are stored machine readable instructions that when executed by the processor, cause the processor to:
obtain a first caller name of a first received call;
display a notification on the device, wherein the notification includes a first button and a first document, wherein the first document is associated with the first caller name;
display a list on the device of at least one name of a second document when the first button is pressed, wherein the at least one second document is associated with the first caller name;
replace the first document with the second document when the at least one second document name is selected from the list.

2. The system of claim 1, wherein a time stamp of the first document and the at least one second document name is within a preconfigured time frame.

3. The system of claim 1, wherein the notification includes a first document organized on an upper half of the notification and a second document organized on a lower half of the notification, wherein both the first document and the second document are associated with the first caller name.

4. The system of claim 3, wherein the notification includes a second button and a third button, wherein the first document is organized on the upper and lower half of the notification when the second button is pressed, and wherein the second document is organized on the upper and lower half of the notification when the third button is pressed.

5. The system of claim 1, wherein the machine readable instructions that are executed by the processor, further cause the processor to obtain a second caller name of a second received call, display a second notification on the device wherein the second notification includes a first document associated with the first caller name in an upper half of the notification, and includes a second document associated with the second caller name in a lower half of the notification.

6. The system of claim 5, wherein the first received call uses one of a cellular network and Wi-Fi network, and the second received call uses an opposite one of the cellular network and the Wi-Fi network.

7. The system of claim 5, wherein when the first received call is active, the notification contains the first document, and when the second received call is active, the notification contains the second document.

8. A method, comprising:
obtaining a first caller name of a first received call on a device;
displaying a notification on the device, wherein the notification includes a first button and a first document, wherein the first document is associated with the first caller name;
displaying a list on the device of at least one name of a second document when the first button is pressed, wherein the at least one second document is associated with the first caller name;
replacing the first document with the second document when the at least one second document name is selected from the list.

9. The method of claim 8, wherein a time stamp of the first document and the at least one second document name is within a preconfigured time frame.

10. The method of claim 8, wherein the notification includes a first document organized on an upper half of the notification and a second document organized on a lower half of the notification, wherein both the first document and the second document are associated with the first caller name.

11. The method of claim 10, wherein the notification includes a second button and a third button, wherein the first document is organized on the upper and lower half of the notification when the second button is pressed, and wherein the second document is organized on the upper and lower half of the notification when the third button is pressed.

12. The method of claim 8, wherein the machine readable instructions that are executed by the processor, further cause the processor to obtain a second caller name of a second received call, display a second notification on the device wherein the second notification includes a first document associated with the first caller name in an upper half of the notification, and includes a second document associated with the second caller name in a lower half of the notification.

13. The method of claim 12, wherein the first received call uses one of a cellular network and Wi-Fi network, and the second received call uses an opposite one of the cellular network and the Wi-Fi network.

14. The method of claim 12, wherein when the first received call is active, the notification contains the first document, and when the second received call is active, the notification contains the second document.

15. A non-transitory computer readable medium comprising instructions, that when read by a processor, cause the processor to perform:
  obtain a first caller name of a first received call on a device;
  display a notification on the device, wherein the notification includes a first button and a first document, wherein the first document is associated with the first caller name;
  display a list on the device of at least one name of a second document when the first button is pressed, wherein the at least one second document is associated with the first caller name;
  replace the first document with the second document when the at least one second document name is selected from the list.

16. The non-transitory computer readable medium of claim 15, wherein a time stamp of the first document and the at least one second document name is within a preconfigured time frame.

17. The non-transitory computer readable medium of claim 15, wherein the notification includes a first document organized on an upper half of the notification and a second document organized on a lower half of the notification, wherein both the first document and the second document are associated with the first caller name.

18. The non-transitory computer readable medium of claim 17, wherein the notification includes a second button and a third button, wherein the first document is organized on the upper and lower half of the notification when the second button is pressed, and wherein the second document is organized on the upper and lower half of the notification when the third button is pressed.

19. The non-transitory computer readable medium of claim 15, wherein the machine readable instructions that are executed by the processor, further cause the processor to obtain a second caller name of a second received call, display a second notification on the device wherein the second notification includes a first document associated with the first caller name in an upper half of the notification, and includes a second document associated with the second caller name in a lower half of the notification.

20. The non-transitory computer readable medium of claim 19, wherein the first received call uses one of a cellular network and Wi-Fi network, and the second received call uses an opposite one of the cellular network and the Wi-Fi network.

\* \* \* \* \*